United States Patent
Koskey, Jr.

(10) Patent No.: US 8,197,681 B2
(45) Date of Patent: Jun. 12, 2012

(54) SUBMERSIBLE FILTER SYSTEM FOR STOCK TANKS AND ORNAMENTAL PONDS

(75) Inventor: James Donald Koskey, Jr., Manitou Springs, CO (US)

(73) Assignee: K&H Manufacturing, LLC, Colorado Springs, CO (US)

( * ) Notice: Subject to any disclaimer, the term of this patent is extended or adjusted under 35 U.S.C. 154(b) by 0 days.

(21) Appl. No.: 12/366,058

(22) Filed: Feb. 5, 2009

(65) Prior Publication Data

US 2010/0193420 A1    Aug. 5, 2010

(51) Int. Cl.
*B01D 35/00*    (2006.01)
(52) U.S. Cl. .............. 210/167.21; 210/170.02; 210/181; 210/416.2
(58) Field of Classification Search ............. 210/167.01, 210/167.1, 170.01, 170.02, 170.09, 175, 210/181, 232, 236, 249, 416.1, 416.2, 167.21
See application file for complete search history.

(56) References Cited

U.S. PATENT DOCUMENTS

| | | | |
|---|---|---|---|
| 4,154,225 A | | 5/1979 | Maher |
| 4,216,091 A | * | 8/1980 | Mineau ..................... 210/175 |
| 4,502,955 A | * | 3/1985 | Schaupp ..................... 210/149 |
| 4,684,462 A | * | 8/1987 | Augustyniak ................ 210/97 |
| 5,277,800 A | * | 1/1994 | Dieckmann et al. ..... 210/167.21 |
| 5,306,421 A | * | 4/1994 | Weinstein ................... 210/151 |
| 5,337,434 A | * | 8/1994 | Erlich ............................ 15/1.7 |
| 5,584,991 A | * | 12/1996 | Wittstock et al. ............ 210/151 |
| 6,054,045 A | * | 4/2000 | Wittstock et al. ....... 210/167.01 |
| 6,318,292 B1 | | 11/2001 | Sakai |
| 6,517,724 B1 | | 2/2003 | Malone |
| 6,684,813 B1 | * | 2/2004 | Lemon ........................ 119/69.5 |
| 6,843,910 B1 | | 1/2005 | Thomas |
| 6,979,401 B1 | | 12/2005 | Porter |
| 7,618,534 B2 | * | 11/2009 | Mihlbauer et al. ....... 210/167.27 |
| 2002/0175117 A1 | | 11/2002 | Ouwinga |

* cited by examiner

*Primary Examiner* — Fred Prince
(74) *Attorney, Agent, or Firm* — Dale B. Halling

(57) ABSTRACT

The invention is directed to a filter system for ornamental ponds and stock tanks that has a housing defining an internal chamber. A number of feet are located on a lower flat surface of the housing, which hold the housing off of the bottom of the pond. A filter slot in the lower surface holds a filter. A pump is inside the internal chamber of the housing and has an inlet inside the internal chamber and an outlet outside the internal chamber of the housing. When the filter system is submerged, the pump draws water in along the bottom of the body of water through the filter. As a result, the debris on the bottom of the body of water is drawn into the filter. Once the debris is drawn into the filter, microbes in the filter are able to break down the debris.

18 Claims, 2 Drawing Sheets

SUBMERSIBLE FILTER SYSTEM FOR STOCK TANKS AND ORNAMENTAL PONDS

BACKGROUND OF THE INVENTION

Stock tanks and ornamental ponds tend to accumulate debris, such as leafs and grass. As this debris accumulates in the water it makes the water unusable for fish living in ornamental ponds and undrinkable for stock animals. There have been a number of attempts to solve this problem. There are a number of filters on the market that draw in water with a pump and filter the water. With all of these filter systems debris that falls to the bottom of the pond or the stock tank is not drawn into the filter. Eventually this debris at the bottom of the pond or stock tank has to be removed by hand. With stock tanks this usually means draining the stock tank, which wastes water and takes time. A number of the filter systems that have been tried require a second tank that is separate from the main body of water. These solutions are expensive and still do not solve the problem of debris accumulating at the bottom of the body of water.

Thus there exists a need for an inexpensive filter system for stock tanks and ornamental ponds that removes the debris from the bottom of the body of water.

BRIEF SUMMARY OF INVENTION

A filter system for ornamental ponds and stock tanks that overcomes these and other problems has a housing defining an internal chamber. A number of feet are located on a lower flat surface of the housing. These feet hold the housing off of the bottom of the pond or tank. A filter slot in the lower surface holds a filter. A pump is inside the internal chamber of the housing and has an inlet inside the internal chamber and an outlet outside the internal chamber of the housing. When the filter system is submerged into a body of water with the feet on the bottom surface of the body of water, the pump draws water in along the bottom of the body of water through the filter and exits the water on an upper surface of the housing. As a result, the debris on the bottom of the body of water is drawn into the filter. Once the debris is sucked into the filter, microbes in the filter are able to break down the debris. As a result the body of water is kept free from debris.

DETAILED DESCRIPTION OF THE INVENTION

The invention is directed to a filter system for ornamental ponds and stock tanks that has a housing defining an internal chamber. A number of feet are located on a lower flat surface of the housing. These feet hold the housing off of the bottom of the pond or tank. A filter slot in the lower surface holds a filter. A pump is inside the internal chamber of the housing and has an inlet inside the internal chamber and an outlet outside the internal chamber of the housing. When the filter system is submerged into a body of water with the feet on the bottom surface of the body of water, the pump draws water in along the bottom of the body of water through the filter and exits the water on an upper surface of the housing. As a result, the debris on the bottom of the body of water is drawn into the filter. Once the debris is sucked into the filter, microbes in the filter are able to break down the debris. As a result the body of water is kept free from debris.

Figure 1:
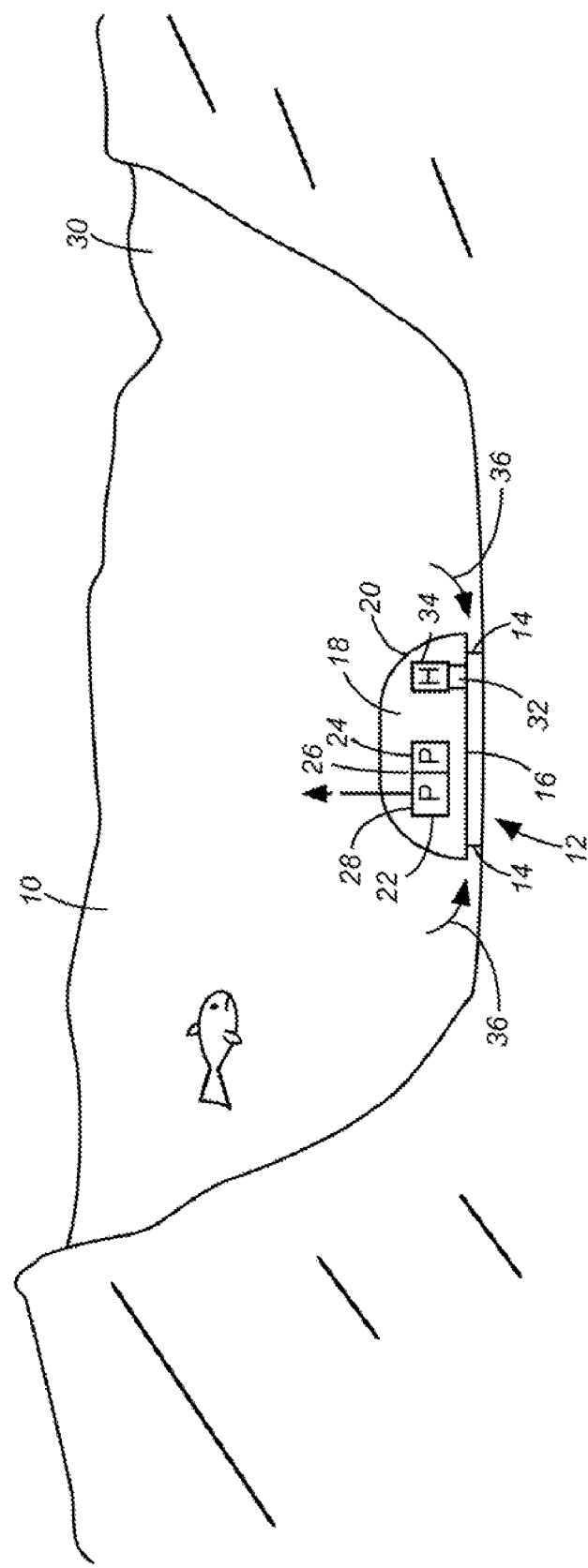
FIG. 1 is a cross sectional view of an ornamental pond with the submersible filter system in accordance with one embodiment of the invention.

FIG. 1 is a cross sectional view of an ornamental pond 10 with the submersible filter system 12 in accordance with one embodiment of the invention. The submersible filter system 12 has feet 14 that sit on the bottom of the pond 10 and hold the lower surface 16 of the filter system off of the bottom of the pond or stock tank. The bottom surface 16 contains a filter that allows water to enter the internal chamber 18 of the housing 20. A pump 22 is attached to the housing 20 and inside the internal chamber 18. A pump or second filter 24 is attached to an inlet 26 of the pump 22. The outlet 28 of the pump 22 is on a top surface of the housing 20 but below the surface level 30 of the pond or body of water. The filter system 12 also has a heater mount 32 attached to the housing 20. A heater 34 may be detachable mounted to the heater mount 32.

In operation, the pump draws water 36 (see arrows) along the bottom of the pond into the lower surface 16 of the housing 20. The water is drawn through the pump 22 and out of the outlet 28. As a result, as the debris falls to the bottom of the pond or stock tank it is drawn along the bottom and into the filter at the bottom 16 of the housing. When trapped in this filter the debris is broken down by microbes. Thus keeping the pond free from debris.

An optional heater can be used to keep the water from freezing. In one embodiment, a thermostat is combined with the heater so that the heater only operates when needed. The thermostat can be placed inside or outside the internal chamber of the housing.

Figure 2:
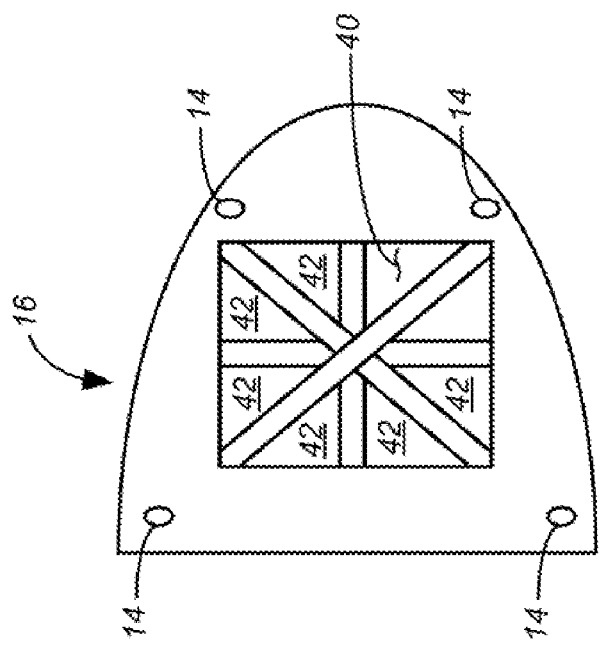
FIG. 2 is a bottom view of the filter system in accordance with one embodiment of the invention.

FIG. 2 is a bottom view of the filter system in accordance with one embodiment of the invention. The bottom 16 of the filter system has a plurality of feet 14. A filter slot 40 is formed in the bottom surface 16 of the filter system. The bottom surface 16 is a flat surface. The filter slot 40 has openings 42 that allows the water to be drawn through the filter 44 as best seen in FIG. 3.

Figure 4:
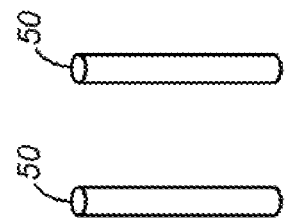
FIG. 4 is a side view of leg extensions for the filter system in accordance with one embodiment of the invention.
Figure 3:
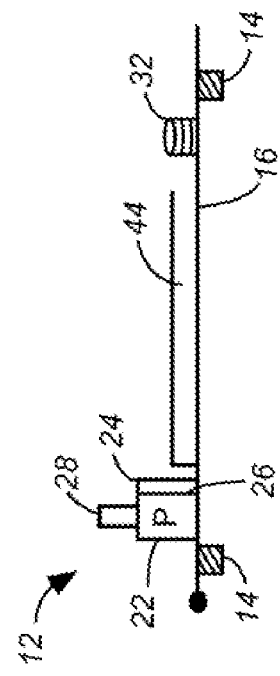
FIG. 3 is a partial cross section view of the filter system in accordance with one embodiment of the invention.

FIG. 3 is a partial cross section view of the filter system 12 in accordance with one embodiment of the invention. The filter system 12 has a number of feet 14. A pump 22 has an inlet 26 with a pump filter 24. The pump 22 also has an outlet 28. A filter slot or chamber 40 is located on the bottom surface 16. A filter 44 is inserted into the filter slot 40. A heater mount 32 is also located on the bottom surface 16 inside the internal chamber 18. In one embodiment, the feet 14 are threaded or otherwise configured to receive leg extensions 50 shown in FIG. 4. The leg extensions 50 may be used to hold the filter system farther off of the ground. This is useful when the pond has accumulated a large amount of dirt or sand in the bottom of the pond. In one embodiment, the leg extension are prenotched so that they can be easily cut to the desired length. They may be cut to different lengths to level the filter system 12 when the bottom of the body of water is uneven.

Thus there has been described a filter system that is capable of clearing the debris from the bottom of a stock tank or ornamental pond. In addition, the filter system has an optional heater that efficiently heats the water in the wintertime to keep it from icing over.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A submersible filter system for stock tanks and ornamental ponds, comprising:
   a housing completely submersed in water having a plurality of feet and a filter slot on a lower surface of the housing;
   a filter in the filter slot; and
   a pump contained in the housing having an inlet inside the housing and an outlet at the top of the housing.

2. The filter system of claim 1, wherein the pump has a second filter attached to the inlet of the pump.

3. The filter system of claim 2, further including a plurality of leg extensions that engage the plurality of feet.

4. The filter system of claim 2, further including a heater mount inside the housing.

5. The filter system of claim 4, further including a heater detachable mounted to the heater mount.

6. The filter system of claim 1, wherein the outlet of the pump is below a water surface.

7. A submersible filter system for stock tanks and ornamental ponds, comprising:
   a housing completely submersed in water having a flat surface with a plurality of feet on the flat surface, the housing forming an internal chamber, the flat surface having a filter slot;
   a filter inserted into the filter slot; and
   a pump inside the internal chamber, the pump having an inlet inside the internal chamber and an outlet outside the internal chamber.

8. The filter system of claim 7, wherein the outlet of the pump is on a top surface of the housing.

9. The filter system of claim 8, further including a second filter attached to the inlet of the pump.

10. The filter system of claim 8, further including a heater mount in the internal chamber of the housing.

11. The filter system of claim 10, further including a heater detachably attached to the heater mount.

12. The filter system of claim 7, further including a heater attached the housing.

13. A submersible filter system for stock tanks and ornamental ponds, comprising:
   a housing completely submersed in water having a filter slot with a plurality openings on a lower surface of the housing, the housing defining an internal chamber, wherein the plurality of openings are a water inlet for the filter system;
   a plurality of feet attached to the housing; and
   a pump attached to the housing and inside the internal chamber, wherein the housing is completely submerged into the water to be filtered.

14. The filter system of claim 13, further including a heater inside the internal chamber of the housing.

15. The filter system of claim 14, wherein the pump has an inlet inside the internal chamber and an outlet outside the internal chamber.

16. The filter system of claim 15, further including a pump filter attached to the inlet of the pump.

17. The filter system of claim 13, wherein the housing has a heater mount attached to the housing.

18. The filter system of claim 13, further including a plurality of legs detachably attached to the plurality of feet.

* * * * *